US008914824B2

(12) United States Patent
Braun et al.

(10) Patent No.: US 8,914,824 B2
(45) Date of Patent: Dec. 16, 2014

(54) VIDEO AD DELIVERY USING CONFIGURABLE VIDEO AD POLICIES

(75) Inventors: David A. Braun, Redmond, WA (US); Mark H. Masterson, Seattle, WA (US); Ashish Gupta, Bothell, WA (US); Mark D. Schwesinger, Bellevue, WA (US); Tianjun Shi, Sammamish, WA (US); Xavier John Vetticappallil, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 865 days.

(21) Appl. No.: 12/350,128

(22) Filed: Jan. 7, 2009

(65) Prior Publication Data

US 2010/0175079 A1 Jul. 8, 2010

(51) Int. Cl.
  *H04N 7/10* (2006.01)
  *H04N 21/81* (2011.01)
  *H04N 7/173* (2011.01)
  *H04N 21/658* (2011.01)
  *H04N 21/262* (2011.01)
  *H04N 21/258* (2011.01)
  *G06Q 30/02* (2012.01)
  *H04N 21/84* (2011.01)

(52) U.S. Cl.
  CPC ......... *H04N 7/17318* (2013.01); *H04N 21/812* (2013.01); *H04N 21/6581* (2013.01); *H04N 21/262* (2013.01); *H04N 21/25833* (2013.01); *G06Q 30/02* (2013.01); *H04N 21/84* (2013.01)
  USPC .................................. 725/32; 725/34; 725/36

(58) Field of Classification Search
  None
  See application file for complete search history.

(56) References Cited

U.S. PATENT DOCUMENTS

| 6,760,916 B2 | 7/2004 | Holtz et al. | |
| 6,799,326 B2 | 9/2004 | Boylan, III et al. | |
| 7,062,510 B1 | 6/2006 | Eldering | |
| 7,669,212 B2 * | 2/2010 | Alao et al. | 725/32 |
| 2002/0147645 A1 * | 10/2002 | Alao et al. | 705/14 |
| 2004/0034601 A1 * | 2/2004 | Kreuzer | 705/52 |
| 2006/0004627 A1 * | 1/2006 | Baluja | 705/14 |

(Continued)

OTHER PUBLICATIONS

"Juniper Networks Services-Aware Architecture", retrieved at <<http://www.juniper.net/solutions/literature/solutionbriefs/351204.pdf>>, Dec. 2007, pp. 4.

(Continued)

*Primary Examiner* — Brian T Pendleton
*Assistant Examiner* — Jean D Saint Cyr
(74) *Attorney, Agent, or Firm* — Micah Goldsmith; Judy Yee; Micky Minhas

(57) ABSTRACT

Systems and methods for video ad delivery using configurable dynamic video ad policies are provided. A system for delivering video ads to a video client may include an ad platform service. The ad platform service may have a media registration module configured to receive input data including a video ad policy and associated metadata and digital video content from a digital video content client. The ad platform service may further include a registration database configured to store input data received from the media registration module. The ad platform service may further include a manifest service and an associated manifest generation engine, wherein the manifest service may be configured to receive an ad manifest request from a video client. In response, the manifest generation engine may be configured to generate a manifest instance based on input data received at the manifest service, the manifest service being configured to send the manifest instance to the video client.

19 Claims, 2 Drawing Sheets

(56) References Cited

U.S. PATENT DOCUMENTS

| | | |
|---|---|---|
| 2006/0135234 A1 | 6/2006 | Godse et al. |
| 2007/0038567 A1* | 2/2007 | Allaire et al. .................. 705/50 |
| 2007/0156838 A1 | 7/2007 | Kocho et al. |
| 2007/0234398 A1* | 10/2007 | Muehlbauer ................. 725/145 |
| 2008/0098420 A1 | 4/2008 | Khivesara et al. |
| 2008/0109369 A1 | 5/2008 | Su et al. |
| 2008/0120646 A1 | 5/2008 | Stern et al. |
| 2008/0127255 A1* | 5/2008 | Ress et al. ...................... 725/38 |
| 2008/0209315 A1* | 8/2008 | Pasquali ....................... 715/273 |

OTHER PUBLICATIONS

"Ad Policies & Targeting", retrieved at <<http://www.brightcove.com/products/advertising/ad-policies>>, Oct. 31, 2008, pp. 2.

* cited by examiner

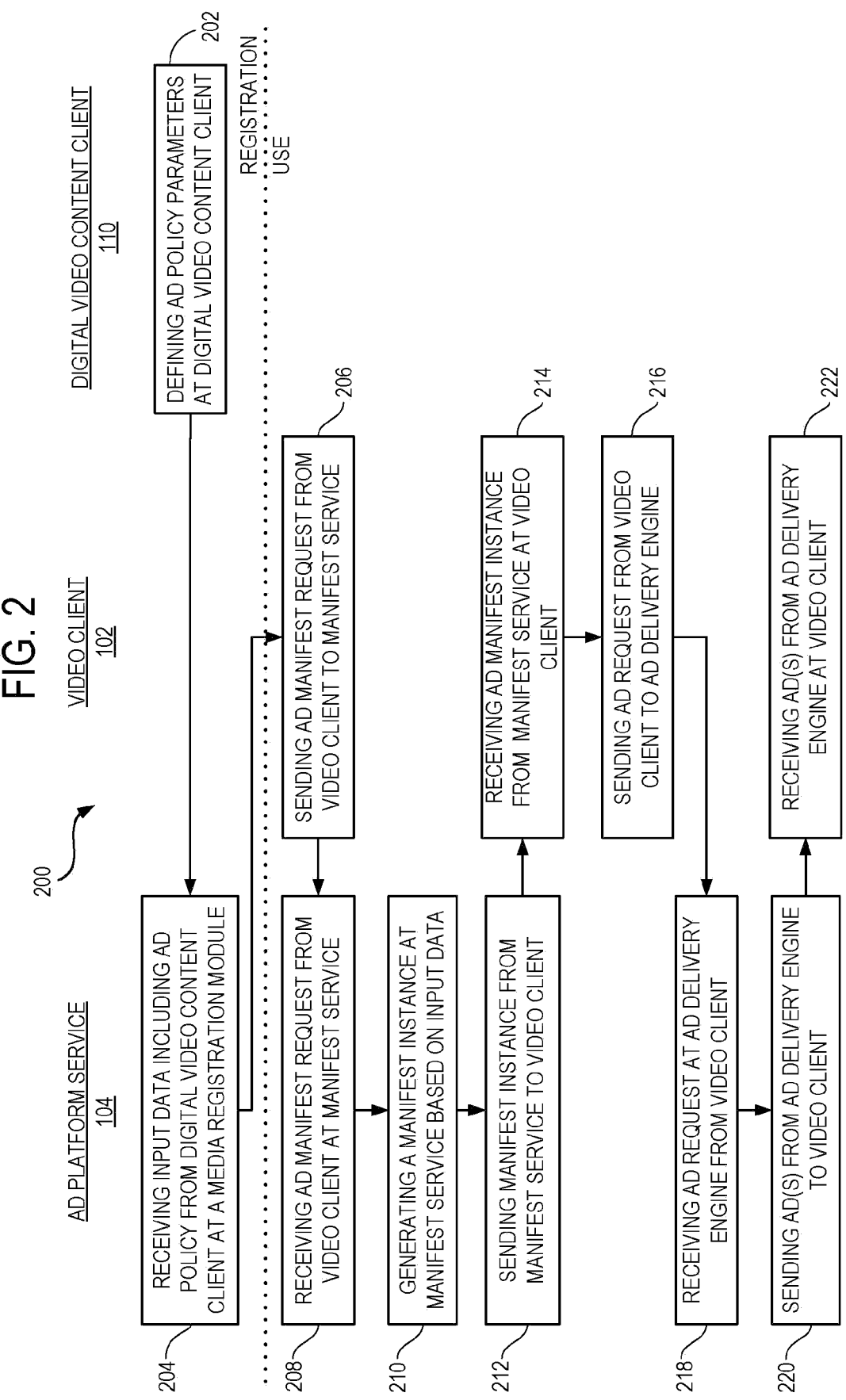

VIDEO AD DELIVERY USING CONFIGURABLE VIDEO AD POLICIES

BACKGROUND

According to current techniques for distribution of television advertisements, advertising breaks are defined according to a schedule. Television programs are designed to accommodate the schedule of advertising breaks. When the time for an advertising break comes, the television program ceases to be shown to viewers, and one or more advertisements are shown instead. At the end of the advertising break, the television program may resume, or another television program may start.

One drawback with this model of television advertisement distribution is that the producer of the television program cannot control the occurrence or timing of the advertising breaks, which can lead to incongruous, inappropriate, or ineffective advertisements being displayed to viewers. Advertising breaks according to a fixed schedule can be disruptive to the natural flow of a television program. For example, sports leagues have gone so far as to change the rules of the game to accommodate so called "television time-outs". As a result, the viewer experience may be degraded, and the effectiveness of the advertisements may decrease.

SUMMARY

Systems and methods for video ad delivery using configurable video ad policies are provided. A system for delivering video ads to a video client may include an ad platform service executable on an advertising server. The ad platform service may have a media registration module configured to receive input data including a video ad policy and associated metadata and digital video content from a digital video content client. The ad platform service may further include a registration database configured to store input data received from the media registration module. The ad platform service may further include a manifest service and an associated manifest generation engine, wherein the manifest service may be configured to receive an ad manifest request from a video client. In response, the manifest generation engine may be configured to generate a manifest instance based on input data received at the manifest service, the manifest service being configured to send the manifest instance to the video client.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 shows a flowchart for an embodiment of a method for delivering video ads to a video client.

DETAILED DESCRIPTION OF THE DRAWINGS

Figure 1:
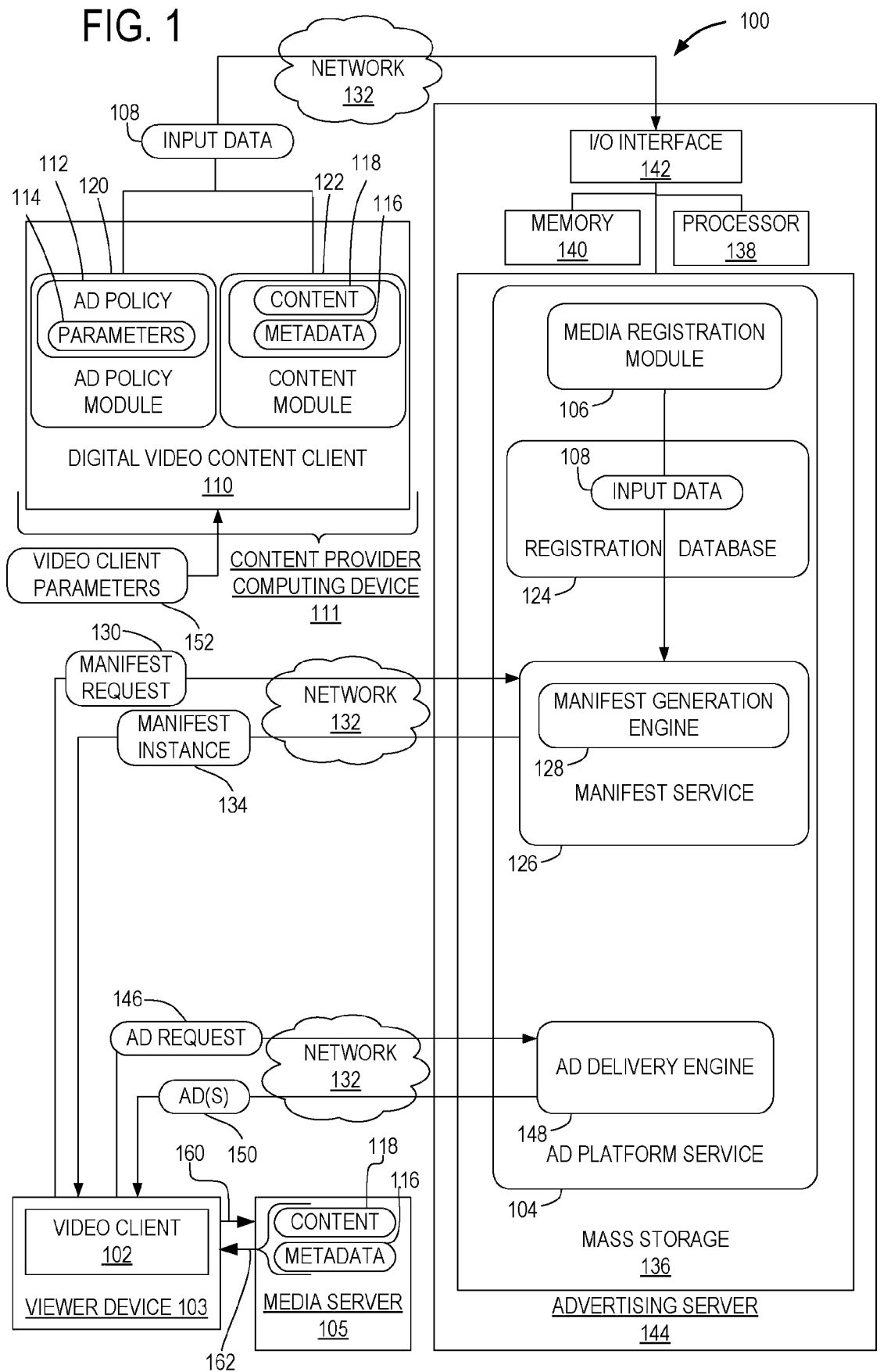
FIG. 1 shows a schematic view of an embodiment of a system for delivering video ads to a video client.

FIG. 1 shows a schematic view of an embodiment of a system 100 configured to deliver video ads 150 to a video client 102 executed on a viewer device 103. The system 100 may include an ad platform service 104 executed on an advertising server 144. The ad platform service 104 may include a media registration module 106 configured to receive input data 108 from a digital video content client 110 executed on a content provider computing device 111. The input data 108 may include a video ad policy 112 including ad policy parameters 114, and associated metadata 116 and digital video content 118 originating from the digital video content client 110. Thus, as illustrated in this example, the digital video content client 110 may include a video ad policy module 120 configured to enable a content provider to generate a video ad policy 112 with ad policy parameters 114, and a content module 122 configured to enable the content provider to specify associated metadata 116 (e.g., ad placement and ad type information) and digital video content 118 (e.g., a video program such as a television show, movie, or video segment).

Ad policy parameters 114 may include ad/program ratio (e.g., a ratio between the length of the ad to be displayed and the video content 118), ad duration, ad type (e.g., ad format, such as rolling text or graphic overlay), ad replay policy (e.g., how frequently the ad can be played), maximum number of ad pods (e.g., ad breaks) to be allowed during playback of the content 118, maximum ads per ad pod, enablement of display of ads prior to starting the content 118 ("pre-roll enablement") and after finishing display of the content 118 ("post-roll enablement"), sponsored ad rules, "click to continue" option (e.g., whether user is allowed to click a button on the viewer device 103 to continue with digital video content 118 without completion of the display of the ad), and/or ad skip threshold (e.g., a number of advertisements a user is allowed to skip during playback of the content, or a duration of ad before user is allowed to skip the remainder of the ad).

The ad platform service 104 may also include a registration database 124, such that the registration database 124 can store input data 108 received from the media registration module 106. The ad platform service 104 may also include a manifest service 126 and an associated manifest generation engine 128.

During use of the video client 102, video client 102 may receive user input indicating that specified digital content 118 and metadata 116 is to be downloaded or streamed to the video client 102. The content 118 and metadata 116 may be stored at a media server 105, for example, which may be part of a separate server system or integrated with the advertising server 144. In response to the user input to download or stream the digital content 118 and metadata 116, the video client 102 is configured to send a request 160 to the media server 105, and to receive a response 162 containing the content 118 and metadata 116.

In addition, upon receiving the user input to download or stream specified content 118, the video client 102 may send an ad manifest request 130, for a specified digital video content 118, to the manifest service 126 over the computer network 132. The manifest service 126 may be configured to receive the ad manifest request 130 from the video client 102 over the computer network 132, and in response, the manifest generation engine 128 may be configured to generate a manifest instance 134. The manifest service 126 may receive this ad manifest request 130, and thereby request input data 108 associated with the specified digital video content 118 from the registration database 124. The manifest service 126 may receive the desired input data 108 from the registration database 124 and thus generate a manifest instance 134 based on the input data 108. The manifest instance 134 may include a rule set that governs the display of ads on the video client 102 for the particular viewing instance of the content 118. If the manifest instance 134 has been generated, the manifest service 126 may be configured such that it may send the manifest instance 134 over the computer network 132 to the video client 102 for subsequent use by the video client 102.

Thus it will be appreciated that during presentation of content 118, such as a video file or streaming video program, an ad may be scheduled for presentation according to the manifest instance 134, and playback of the content 118 may be temporarily suspended at the scheduled time for the playback of one or more ads, or alternatively the playback may continue and the ad may be presented adjacent or overlaid on the content 118, according to metadata 116. The selection of ads, timing and placement is determined according to the manifest instance 134, which has been generated based on the content provider's specified video ad policy.

As mentioned above, the manifest instance 134 is generated based on ad policy parameters 114 of the video ad policy 112. One way in which ad policy parameters 114 may be defined is based on temporal parameters, such as time of day, and/or day of the year. Thus, in one example, using the ad policy parameters 114, the manifest instance 134 may specify that duration of ads is shorter for television programs broadcasting on weekday evenings compared to weekday afternoons.

Ad policy parameters 114 can be further defined based on one or more video client parameters 152, which may be received at the digital video content client 110 from the developer of the video client 102, a standards body, or other source, for example. Video client parameters 152 may include a type of video client. The type of video client may include video clients configured to be executed on a variety of viewer devices, including a set-top box, which is an input device that connects directly to a television set, a mobile phone, a personal computer, gaming system, and handheld personal digital assistant, for example. Thus, in one example, the manifest instance 134 may specify that the "click to continue" option is not available for ads sent to a television set and that the "click to continue" option is available for ads sent to a personal computer.

Other video client parameters 152 may include a number of video clients, wherein the number of video clients may include the number of concurrent video clients viewing the content 118 concurrently, the number of aggregate video clients viewing all content available, and/or the number of video clients over a predetermined time period. Thus, one example manifest instance 134 may specify that the ad/program ratio is higher when there are a greater number of concurrent video clients, based on the ad policy parameters 114 associated with the digital video content 118.

Further still, the ad policy parameters 114 may be based on video client parameters 152 including user characteristics associated with the video client 102 (e.g., user demographic, user viewing behavior). In another example, ad policy parameters 114 may be based on video client parameters 152 including a digital video content replay policy, wherein a digital video content replay policy may include the aggregate number of replays of a digital video content 118. That is, the manifest instance 134 may specify that the maximum number of ad pods may be increased for a video program that has a low replay frequency, as one example.

It may be appreciated that the ad policy parameters 114 may be dynamically re-definable or configurable to enable the digital video content client 110 to modify the video ad policy 112 by updating one or more ad policy parameters 114, wherein the updating of one or more ad policy parameters 114 does not conflict with the pre-existing video ad policy and wherein the updating may include adding one or more new ad policy parameters 114. For example, the video ad policy may be XML format such that the addition of a new condition for a video ad policy parameter value or state does not negate a previous condition for the same ad policy parameter value or state. That is, as one example, if a first condition of the video ad policy 112 specifies that a video program with many viewers has a high ad/program ratio and a second condition of the video ad policy 112 is added to specify that a video program with a low replay policy has a high ad/program ratio, the second condition does not nullify the first condition. Rather, either condition or both conditions combined may result in a high ad/program ratio. In this way, the addition of one or more new ad policy parameters does not conflict with the pre-existing video ad policy.

The manifest instance 134 received at the video client 102 from the manifest service 126 may enable the video client 102 to send an ad request 146 to an ad delivery engine 148 associated with the ad platform service 104. Further, the manifest instance 134 may enable the video client 102 to receive one or more ads 150 from the ad delivery engine 148 responsive to the ad request 146. In one example, this may be done such that the video client 102 may request and receive ads 150 for display on a television. It may be appreciated that the ads 150 received at the video client 102 may thus be based on the manifest instance 134 received at the video client 102.

As illustrated in FIG. 1, the ad delivery engine 148 is a component of the in the ad platform service 104. In other examples, the ad delivery engine 148 may exist on the advertising server 144 outside of the ad platform service 104. In yet another example, an ad delivery engine may exist on another computing device that the video client 102 can communicate with over computer network 132.

It will be appreciated that the ad platform service 104 and its various software components described above may be stored in a mass storage 136 and executed on a processor 138 using portions of memory 140 and may further be configured to communicate with software on other computing devices across one or more computer networks 132, via input/output module 142. It will further be appreciated that the advertising server 144 may be a single server, or multiple distributed servers interoperating across one or more computer networks 132 (e.g., Local area network, Internet, etc.), and the components of ad platform service 104 may be implemented on these distributed devices. In alternate examples, several different computer networks may be used for transmission of data, manifest requests, manifest instances, ad requests, ads, etc.

Turning now to FIG. 2, a flowchart illustrating an embodiment of a method 200 for delivering video ads to a video client executed on a viewer device is shown. Here, there are three columns, which respectively illustrate actions taking place at the ad platform service 104, the video client 102, and the digital video content client 110.

As illustrated at 202, the method may include defining ad policy parameters at a digital video content client executed on a content provider computing device. At 204 the method may include receiving, from the digital video content client, input data including the video ad policy and associated metadata and digital video content, at the media registration module of an ad platform service executed on an advertising server. Defining at 202 and receiving at 204 may occur, for example, in a content and ad policy registration phase of the method.

In a use phase of the method 200, the method may include, at 206, sending an ad manifest request from the video client to a manifest service of the ad platform service. At 208, the method may include receiving, from the video client, the ad manifest request at the manifest service of the ad platform service. At 210, the method may include generating, in response to the ad manifest request, a manifest instance at the manifest service based on the input data associated with the ad manifest request. At 212, the method may further include sending the manifest instance to the video client, from the manifest service of the ad platform, responsive to the ad manifest request.

At 214, the method may include receiving, at the video client, the manifest instance from the manifest service of the ad platform service, responsive to the ad manifest request. At 216, the method may include sending an ad request to an ad delivery engine based on the manifest instance.

At 218, the method may further include receiving, from the video client, an ad request at an ad delivery engine associated with the ad platform service. At 220, the method may include sending one or more ads from the ad delivery engine of the ad platform service to the video client, responsive to an ad request.

At 222, the method may include receiving, at the video client, one or more ads from the ad delivery engine based on the manifest instance, responsive to the ad request.

As described above, the video ad policy may include ad policy parameters including one or more of ad/program ratio, ad duration, ad type, maximum number of ad pods, maximum ads per ad pod, pre-roll and post-roll enablement, sponsored ad rules, "click to continue" option, and ad skip threshold. Further, the ad policy parameters may be dynamically re-definable or configurable to enable the digital video content client to modify the video ad policy by adding one or more new ad policy parameters, wherein the addition of one or more new ad policy parameters does not conflict with the pre-existing video ad policy.

It will be appreciated that the ad policy parameters may be based on a variety of factors, including temporal parameters, and/or on one or more video client parameters, as described above. The video client parameters may include a type of viewer device on which the video client is configured to be executed, such as a set-top box, a mobile phone, a personal computer, gaming system, and handheld personal digital assistant. Further, the video client parameters may include a number of video clients, wherein the number of video clients may include one or more of the number of concurrent video clients, the number of aggregate video clients, the number of video clients over a predetermined time period, as described above.

Further, the video client parameters may include one or more of user characteristics associated with the video client, and a digital video content replay policy, wherein a digital video content replay policy may include the aggregate number of replays of a digital video content. The metadata associated with the content may include ad placement and ad type information, which may specify how the ad is to be placed and the type of ad, as described above.

The above described systems and methods may enable a content provider to specify, and in some cases dynamically change, a video ad policy governing ad selection and presentation for playback of the content on a viewer device. This may increase the appropriateness of the ad timing and selection, and in some cases enable the content provider to give the user an option regarding whether to view an ad. The result may be an enhanced viewing experience and an increase in the effectiveness of ads presented to viewers.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A system for delivering video ads to a video client, the system comprising an ad platform service executable on an advertising server, the ad platform service including:

a media registration module configured to receive input data including a video ad policy and associated metadata and digital video content from a digital video content client of a content provider, the video ad policy defined based on a plurality of video client parameters and a plurality of ad policy parameters, the plurality of video client parameters including a number of video clients and a type of viewer device on which the video client is configured to be executed, wherein the number of video clients includes one or more of a number of concurrent video clients, a number of aggregate video clients, and a number of video clients over a predetermined time period, and wherein the associated metadata specifies an ad placement position in the digital video content and one or more conditions that trigger a dynamic change in one or more of the plurality of ad policy parameters that define the video ad policy;

a registration database configured to store input data received from the media registration module; and a manifest service and an associated manifest generation engine, wherein the manifest service is configured to receive an ad manifest request from a video client executed on a viewer device of a user, where the ad manifest request is received from the video client after the video client has received user input to download or stream the digital video content, and in response to receiving the ad manifest request, the manifest generation engine is configured to generate an ad manifest instance based on the type of the viewer device of the user, the ad manifest instance specifying device-specific ad functionality included or omitted in an ad based on the type of viewer device, and the input data received at the media registration module from the content provider and stored in the registration database, wherein if the one or more conditions have occurred, the ad manifest instance is generated to include an updated video ad policy having one or more dynamically changed ad policy parameters that govern display of ads on the video client for a particular viewing instance of the digital video content, and wherein if the one or more conditions have not occurred, the ad manifest instance is generated to include the video ad policy including the plurality of ad policy parameters originally specified at registration of the digital video content that governs display of ads on the video client for a particular viewing instance of the digital video content, the manifest service being configured to send the ad manifest instance to the video client;

wherein the ad manifest instance sent to the video client enables the video client to send an ad request to an ad delivery engine associated with the ad platform service and further enables the video client to receive one or more ads from the ad delivery engine responsive to the ad request, where the one or more ads are based on the manifest instance sent to the video client.

2. The ad platform service of claim 1, wherein the ad policy parameters include one or more of ad/program ratio, ad duration, ad type, ad replay policy, maximum number of ad pods, maximum ads per ad pod, pre-roll and post-roll enablement, sponsored ad rules, "click to continue" option, and ad skip threshold.

3. The ad platform service of claim 2, wherein dynamically changing the one or more dynamically changed ad policy parameters does not conflict with a pre-existing video ad policy.

4. The ad platform service of claim 3, wherein the ad policy parameters are defined based on temporal parameters.

5. The ad platform service of claim 1, wherein the type is one or more of a set-top box, a mobile phone, a personal computer, a gaming system, and a handheld personal digital assistant.

6. The ad platform service of claim 1, wherein the plurality of video client parameters further include one or more of user characteristics associated with the video client and a digital video content replay policy, wherein the digital video content replay policy may include an aggregate number of replays of the digital video content.

7. The ad platform service of claim 1 wherein metadata includes ad type information.

8. A method for delivering video ads to a video client, the method comprising, at an advertising server:
receiving, from a digital video content client of a content provider, input data including a video ad policy and associated metadata and digital video content, at a media registration module of an ad platform service, the video ad policy being defined based on a plurality of ad policy parameters and a plurality of video client parameters, the plurality of client parameters including a number of video clients and a type of viewer device on which the video client is configured to be executed, wherein the number of video clients includes one or more of a number of concurrent video clients, a number of aggregate video clients, and a number of video clients over a predetermined time period, and wherein the associated metadata specifies an ad placement position in the digital video content and one or more conditions that trigger a dynamic change in one or more of the plurality of ad policy parameters that define the video ad policy;
storing the input data from the registration module in a registration database;
receiving, from a video client executed on a viewer device, an ad manifest request at a manifest service of the ad platform service, where the ad manifest request is received from the video client after the video client has received user input to download or stream the digital video content;
generating, in response to the ad manifest request, an ad manifest instance at the manifest service based on the type of the viewer device, the ad manifest instance specifying device-specific ad functionality included or omitted in an ad based on the type of viewer device, and the input data from the registration database associated with the ad manifest request, wherein if the one or more conditions have occurred, the ad manifest instance is generated to include an updated video ad policy having one or more dynamically changed ad policy parameters that govern display of ads for the ad manifest instance, and wherein if the one or more conditions have not occurred, the ad manifest instance is generated to include the video ad policy including the plurality of ad policy parameters originally specified at registration of the digital video content; and
sending the ad manifest instance to the video client, from the manifest service of the ad platform, responsive to the ad manifest request;
receiving, from the video client, an ad request at an ad delivery engine associated with the ad platform service, the ad request being based on the ad manifest instance; and
sending one or more ads from the ad delivery engine of the ad platform service to the video client, responsive to the ad request, where the one or more ads are based on the ad manifest instance sent to the video client.

9. The method of claim 8, wherein the plurality of ad policy parameters includes one or more of ad/program ratio, ad duration, ad type, maximum number of ad pods, maximum ads per ad pod, pre-roll and post-roll enablement, sponsored ad rules, "click to continue" option, and ad skip threshold, and wherein the ad policy parameters are dynamically re-definable to enable the digital video content client to modify a pre-existing video ad policy by adding one or more new ad policy parameters, wherein the addition of one or more new ad policy parameters does not conflict with the pre-existing video ad policy.

10. The method of claim 9, wherein the plurality of ad policy parameters are further based on temporal parameters.

11. The method of claim 8, wherein the type of viewer device is one or more of a set-top box, a mobile phone, a personal computer, a gaming system, and a handheld personal digital assistant.

12. The method of claim 8, wherein the plurality of video client parameters further include one or more of user characteristics associated with the video client and a digital video content replay policy, wherein the digital video content replay policy may include an aggregate number of replays of the digital video content.

13. The method of claim 8, wherein metadata includes ad type information.

14. A method for use in display of video ads on a video client executed on a viewer device, the method comprising:
sending, in response to user input to download or stream digital content and metadata, a request to a media server, the metadata specifying an ad placement position in the digital content;
receiving a response from the media server, responsive to the request, wherein the response contains the digital content and metadata;
sending an ad manifest request to a manifest service of an ad platform service executed on an advertising server, wherein the ad manifest request is based on the digital content and metadata;
receiving an ad manifest instance from the manifest service of the ad platform service, responsive to the ad manifest request, wherein the ad manifest instance is created by the manifest service based on a type of the viewer device, the ad manifest instance specifying device-specific ad functionality included or omitted in an ad based on the type of viewer device, and input data received from a registration database, wherein the input data includes a video ad policy received from a digital video content client of a content provider and one or more conditions that trigger a dynamic change in the video ad policy, wherein the video ad policy includes a plurality of ad policy parameters that govern display of ads with the digital content, the ad policy parameters being dynamically re-definable to enable the digital video content client to modify a pre-existing video ad policy by adding one or more new ad policy parameters, wherein the addition of one or more new ad policy parameters does not conflict with the pre-existing video ad policy, wherein if the one or more conditions have occurred, the ad manifest instance is generated to include an updated video ad policy having one or more dynamically changed ad policy parameters that govern display of ads for the ad manifest instance, and wherein if the one or more conditions have not occurred, the ad manifest instance is generated to include the video ad policy including the plurality of ad policy parameters originally specified at registration of the digital content;

sending an ad request to an ad delivery engine based on the ad manifest instance; and receiving one or more ads from the ad delivery engine based on the ad manifest instance, responsive to the ad request.

15. The ad platform service of claim 1, wherein the one or more conditions include a total viewership of the digital video content exceeding a viewership threshold, a time since release of the digital video content exceeding a time threshold, and a time of day being within a designated time range.

16. The method of claim 8, wherein the one or more conditions include a total viewership of the content exceeding a viewership threshold, a time since release of the content exceeding a time threshold, and a time of day being within a designated time range.

17. The method of claim 14, wherein the one or more conditions include a total viewership of the digital content exceeding a viewership threshold, a time since release of the digital content exceeding a time threshold, and a time of day being within a designated time range.

18. The method of claim 14, wherein a plurality of ad policy parameters include one or more of an ad/program ratio, ad duration, ad type, maximum number of ad pods, maximum ads per ad pod, pre-roll and post-roll enablement, sponsored ad rules, "click to continue" option, and ad skip threshold.

19. The method of claim 14, wherein a plurality of ad policy parameters are defined based on a number of video clients and a type of viewer device on which a video client is configured to be executed, wherein a number of video clients includes one or more of a number of concurrent video clients, a number of aggregate video clients, and a number of video clients over a predetermined time period.

* * * * *